United States Patent

[11] 3,627,131

[72] Inventors Brian L. Goodman
 Overland Park, Kans.;
 Frank G. Weis, Kansas City, Mo.; Kenneth
 A. Mikkelson, Overland Park, Kans.
[21] Appl. No. 795,541
[22] Filed Jan. 31, 1969
[45] Patented Dec. 14, 1971
[73] Assignee Ecodyne Corporation
 Chicago, Ill.

[54] METHOD AND APPARATUS FOR FILTERING SOLIDS FROM LIQUIDS
 2 Claims, 1 Drawing Fig.
[52] U.S. Cl. .................................................. 210/82,
 210/108
[51] Int. Cl. ...................................................... B01d 23/24
[50] Field of Search ............................................ 210/80, 81,
 82, 104, 105, 108, 130, 137

[56] References Cited
 UNITED STATES PATENTS

| | | | |
|---|---|---|---|
| 402,147 | 4/1889 | Denison | 210/416 X |
| 2,423,329 | 7/1947 | Le Clair | 210/137 X |
| 2,458,893 | 1/1949 | Campbell | 210/137 X |
| 2,477,404 | 7/1949 | Butt, Jr. | 210/416 X |
| 2,549,063 | 4/1951 | De Haven | 210/416 X |
| 3,220,553 | 11/1965 | Growall et al. | 210/108 |
| 3,279,604 | 10/1966 | Leviel | 210/137 X |
| 3,342,334 | 9/1967 | Sodiente et al. | 210/108 |
| 3,459,302 | 8/1969 | Ross | 210/80 |

Primary Examiner—John Adee
Attorney—Charles M. Kaplan

ABSTRACT: In removing suspended solids from a liquid in a filter tank containing a filter bed and forming an underdrain compartment beneath the bed, liquid is passed downwardly through the filter bed while maintaining a pressure head above the bed. Intermittently, liquid is pumped from the underdrain compartment to increase the flow through the filter bed when the pressure head increases above a predetermined maximum level. Preferably, this pumping is halted when the pressure head drops below a predetermined minimum level.

Apparatus which may be employed to carry out the method comprises a filter tank having a filter bed separating it into an upper inlet compartment and a lower underdrain compartment. Sensing means are provided for sensing a predetermined maximum liquid level in the inlet compartment, and suction means communicate with the underdrain compartment for withdrawing liquid at an increased rate. The suction means are activated by the liquid in the inlet compartment rising to the maximum level. In the preferred embodiment, upper and lower sensing means are provided, and the suction means are deactivated by the liquid reaching a predetermined minimum level according to the position of the lower sensing means.

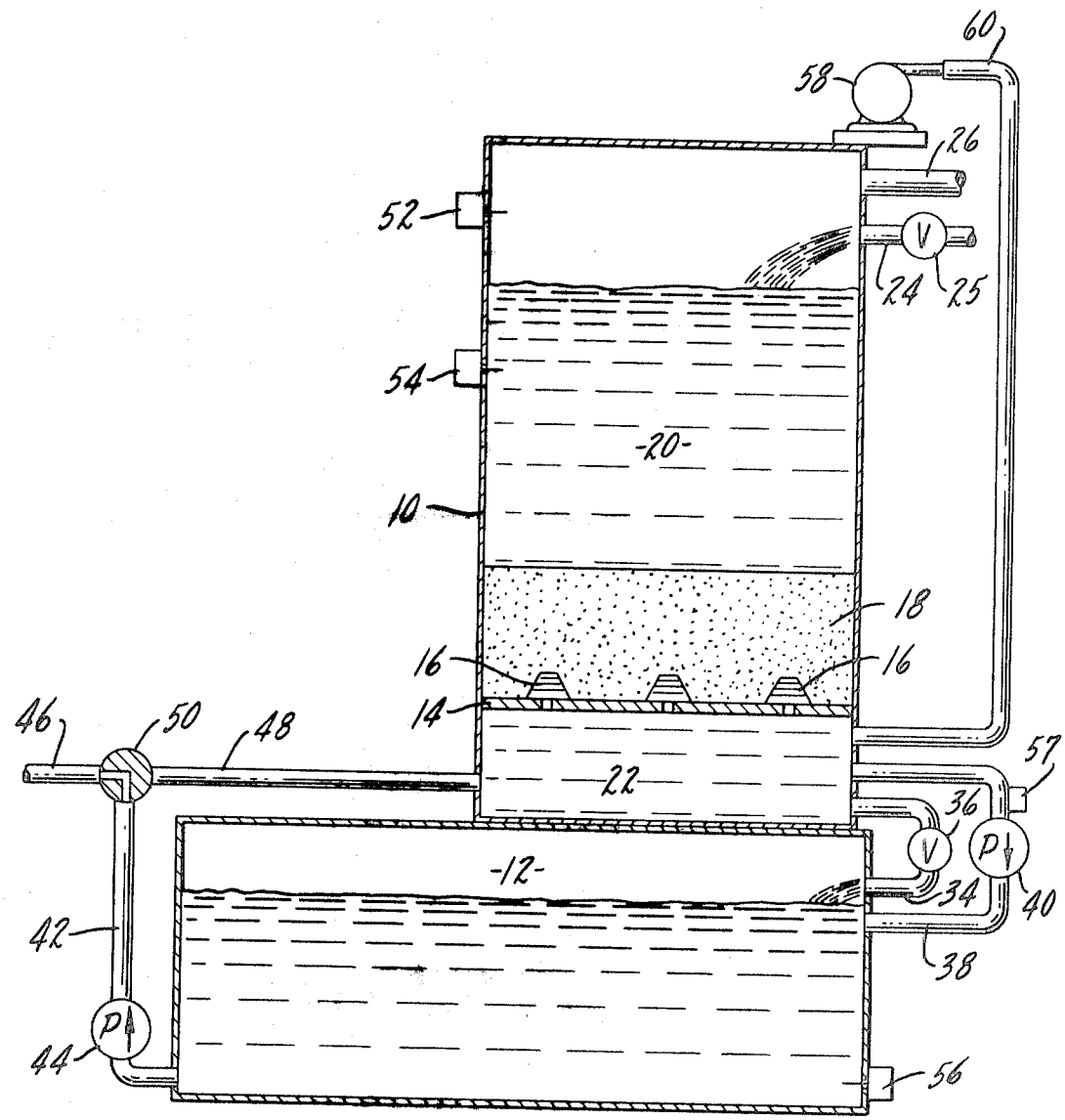
INVENTORS.
BRIAN L. GOODMAN
FRANK G. WEIS
KENNETH A. MIKKELSON
BY Hume, Clement, Hume & Lee
Attorneys.

METHOD AND APPARATUS FOR FILTERING SOLIDS FROM LIQUIDS

The present invention relates to an improved method and apparatus for filtering solids from liquids, and more specifically, to an improved method and apparatus for filtering solids from liquids by the use of intermittent suction.

Filters utilizing a pump to increase the rate at which liquids are passed through the filter bed are well known in the art. This pump may be either on the input side of the filter bed or on the outlet side (a so-called "vacuum" pump). In the case of a pump on the input side, there is an undesirable tendency of the pump to reduce the size of suspended solids in the liquid before delivery to the filter bed, thus increasing the difficulty of filtration. Furthermore, it is necessary that the pump be of such a type that it can pass solids along with liquids. In the case of vacuum pumps, careful adjustment of the pumping rate to match the liquid input rate has been necessary. In addition, it is undesirable to employ such pumps when the bed is clean, as excessive throughput rates may be achieved. If the pump is of a low enough capacity not to produce excessive throughputs in a clean bed, it will have insufficient capacity when the bed collects solid particles. Frequent backwashing will then be required.

Generally, the present invention relates to an improved method for filtering solids from liquids in a filter including a filter tank, a filter bed in the filter tank, and an underdrain compartment beneath the filter bed. In carrying out the method, a liquid containing suspended solids, such as sewage, is passed through the filter bed while maintaining a pressure head of liquid above the filter bed. When the pressure head increases above a predetermined maximum level, liquid is pumped from the underdrain compartment at a rate sufficient to increase the rate of flow through the filter bed. Preferably, this pumping is also terminated in accordance with a predetermined decrease in the level of the pressure head above the filter bed. Specifically, the pumping may be terminated when the pressure head drops below a predetermined minimum level.

The present invention also provides apparatus for carrying out the aforementioned method, including a filter tank containing a filter bed separating the tank into an inlet compartment above the filter bed and an underdrain compartment beneath the filter bed. The inlet compartment includes sensing means for sensing a maximum liquid level or head in the inlet compartment, and suction means communicate with the underdrain compartment for withdrawing liquid from the underdrain compartment at an increased rate of speed when the suction means are activated by the pressure head rising above the level of the sensing means.

Although the pump may be shut off by a timer, in the preferred embodiment the apparatus includes both upper and lower sensing means for sensing both a predetermined maximum and a predetermined minimum liquid level in the inlet compartment. The suction means are activated by the liquid rising above the level of the upper sensing means, and deactivated by the liquid falling below the lower sensing means.

The invention, its construction and method of operation, will be best understood by reference to the following detailed description taken in conjunction with the drawing, which is a cross-sectional view of a filter embodying the features of the present invention.

Referring to the drawing, the filter of the present invention includes a filter tank 10 and a backwash storage tank 12. In the preferred embodiment shown, the filter tank 10 is located on top of the backwash storage tank 12, although, as those skilled in the art will appreciate, other arrangements may be employed. Mounted within the filter tank 10 is a false bottom member 14 with suitable strainer members 16 which permit liquid to pass through the false bottom member 14, as is well known in the art. A filter bed 18 of suitable filter media, such as sand, anthracite, and the like, is situated within the filter tank 10 on the false bottom member 14. The filter bed 18 and false bottom member 14 separate the tank 10 into an inlet compartment 20 and an underdrain compartment 22. An inlet pipe 24, having a valve 25, and a backwash outlet pipe 26 communicate with the inlet compartment 20, preferably at an upper portion thereof.

Communication between the underdrain compartment 22 and the backwash storage tank 12 is provided by a connecting conduit 34 having a valve 36. A vacuum conduit 38 having a suction or vacuum pump 40 also communicates between the underdrain compartment 22 and the backwash storage tank 12.

A transfer conduit 42 having a pump 44 communicates with a service outlet pipe 46 and a backwash delivery pipe 48 at a T-juncture having a two-way valve 50. As will be appreciated by those skilled in the art, two or more such pumps may sometimes be employed to guard against breakdown and/or overflow in the backwash storage tank 12.

As will be explained hereinafter, the operation of the embodiment shown is controlled responsive to signals from various sensors. The filter tank 10 carries two liquid level sensors, communicating with the inlet compartment 20. An upper level sensor 52 communicates with an upper portion of the inlet compartment 20, while a lower level sensor 54 communicates with the inlet compartment 20 below the upper level sensor 52. A backwash exhaust level sensor 56 communicates with a lower portion of the backwash storage tank 12 as shown in the drawing. While the level sensors 52, 54, and 56 shown in the drawing are of the electrode type, it will be understood by those skilled in the art that any of a large number of well-known liquid level sensors may be employed. A suction sensor 57 is positioned on the vacuum conduit 38 between the underdrain component 22 and the vacuum pump 40 to sense the amount of suction developed when the pump 40 is operating.

In order that an air-scour technique may optionally be employed during the backwashing procedure, the preferred embodiment of the present invention shown in the drawing includes an air blower 58 communicating with the underdrain compartment 22 through an air conduit 60.

In operation, during the service cycle, liquid containing suspended solids, such as sewage, is delivered to the inlet compartment 20 of the filter tank 10 through the inlet pipe 24. Under the influence of the pressure head which is built up in the inlet compartment 20, the liquid passes downwardly through the filter bed 18, through the strainer members 16, and into the underdrain compartment 22. This filtered liquid then passes to the backwash storage tank 12 through the connecting conduit 34. The filtered liquid is pumped from the backwash storage tank 12 through the transfer conduit 42 by the pump 44. As shown in the drawing, the two-way valve 50 is set to deliver the filtered liquid to the service outlet pipe 46.

The pressure head in the inlet compartment 20 will eventually reach a level where it is fairly constant, i.e., where it produces enough pressure to permit continuous flow through the filter bed 18. A filtered solids are collected by the filter bed 18, more and more pressure will be required to pass liquid through the filter bed 18, and the pressure head will rise. Eventually, the rising pressure head will come into contact with the upper level sensor 52. When this occurs, the vacuum pump 40 on the vacuum conduit 38 will be actuated, and the valve 36 on the connecting conduit 34 will be closed. Liquid will now be withdrawn from the underdrain compartment 22 at an increased rate, causing the pressure head 20 to drop until it passes the lower level sensor 54. When the lower level sensor 54 senses the passage of the liquid level, the vacuum pump 40 will be shut off, the valve 36 will be opened, and liquid will again flow from the underdrain compartment 22 to the backwash storage tank 12 through the connecting conduit 34. The level of the liquid in the inlet compartment 20 will then again begin to rise.

The above-described cycle is repeated until the filter bed 18 has collected sufficient solids to require backwashing. The backwashing cycle is preferably initiated automatically be sensing the amount of suction developed by the vacuum pump 40 at the suction sensor 57. The suction sensor 57 will indicate the amount of clogging of the filter bed 18 that has taken place, and it may thus be set to initiate backwashing after a predetermined amount of solids has been collected by the filter bed 18. When this point is reached, the valve 25 in the inlet pipe 24 is closed, while the vacuum pump 40 continues to run.

When the liquid level passes the lower level sensor 54, the vacuum pump 40 is shut down, and the air-scour step is initiated by starting the blower 58. This delivers air upwardly through the filter bed 18, loosening entrapped particles. At the end of the air-scour step, the blower 58 is shut off by a suitable timer (not shown), and the backwashing step is initiated.

To indicate the backwashing step, the two-way valve 50 is adjusted to provide communication between the transfer conduit 42 and the backwash delivery pipe 48. The pump 44 is started, and delivers backwash water upwardly through the filter bed 18 into the inlet compartment 20, and finally out the backwash outlet pipe 26. When the backwash storage tank 12 is empty, as indicated by the liquid level passing the backwash exhaust level sensor 56, the two-way valve 50 is adjusted to provide communication to the service outlet pipe 46, and the valves 30, 36 on the inlet pipe 24 and connecting conduit 34, respectively, are opened and normal operation is resumed as described above.

Obviously, many modifications and variations of the invention, as hereinbefore set forth, may be made without departing from the spirit and scope thereof, and it is intended to cover in the appended claims all such modifications and variations as fall within the true spirit and scope of the invention.

We claim:

1. A method for filtering suspended solids from liquids in a filter including a filter tank, a filter bed in said filter tank and an underdrain compartment beneath said filter bed, said method comprising:
    a. passing a liquid containing solids through said filter bed while maintaining a pressure head above said filter bed;
    b. sensing when the level of said pressure head increases above a predetermined maximum level;
    c. pumping liquid from said underdrain compartment to increase the flow through said filter bed when said pressure head reaches said predetermined maximum level;
    d. sensing when the level of said pressure head drops below a predetermined minimum level;
    e. terminating said pumping when said pressure head drops below said predetermined minimum level;
    f. sensing when the pressure drop required to accomplish said pumping reaches a predetermined valve; and
    g. backwashing said filter when said pressure drop reaches said predetermined valve.

2. A method for filtering suspended solids from liquids in a filter including a filter tank, a filter bed in said filter tank, an underdrain compartment beneath said filter bed, a backwash storage tank below said filter tank, and first and second conduits each connecting said underdrain compartment with said backwash storage tank, said method comprising:
    a. passing by gravitational flow a liquid containing solids through said filter bed into said underdrain compartment and then through said first conduit into said backwash storage tank while maintaining a pressure head above said filter bed;
    b. sensing when the level of said pressure head increases above a predetermined maximum level;
    c. closing off liquid flow through said first conduit and initiating pumping of liquid from said underdrain compartment through said second conduit into said backwash storage tank to increase the flow through said filter bed and said second conduit when said pressure head reaches said predetermined maximum level;
    d. sensing when the level of said pressure head drops below a predetermined minimum level; and
    e. opening liquid flow through said first conduit and terminating said pumping and liquid flow through said second conduit when said pressure head drops below said predetermined minimum level.

* * * * *